No. 867,686.
PATENTED OCT. 8, 1907.
B. F. TRIPP.
ROWLOCK.
APPLICATION FILED MAR. 30, 1906.
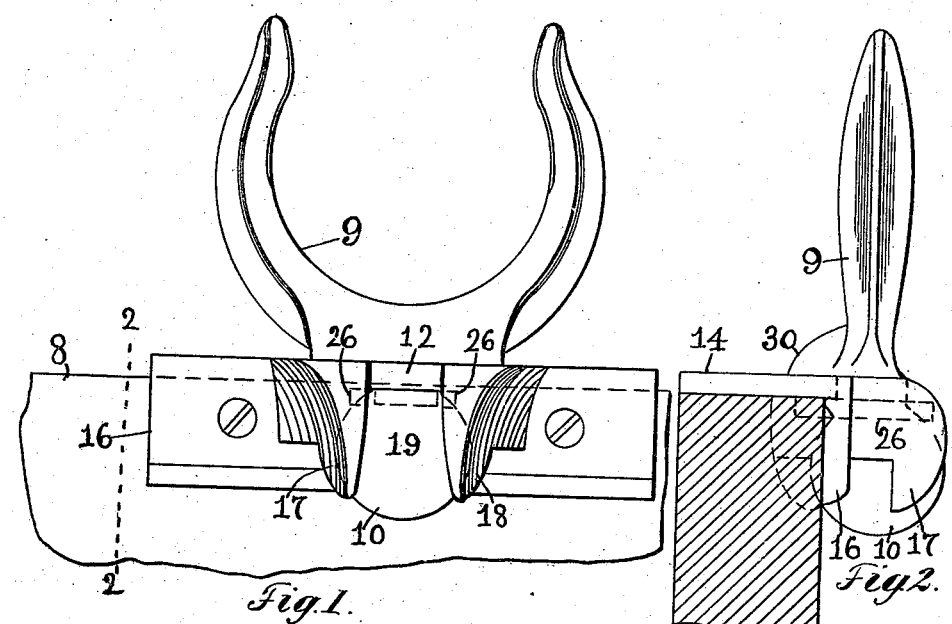
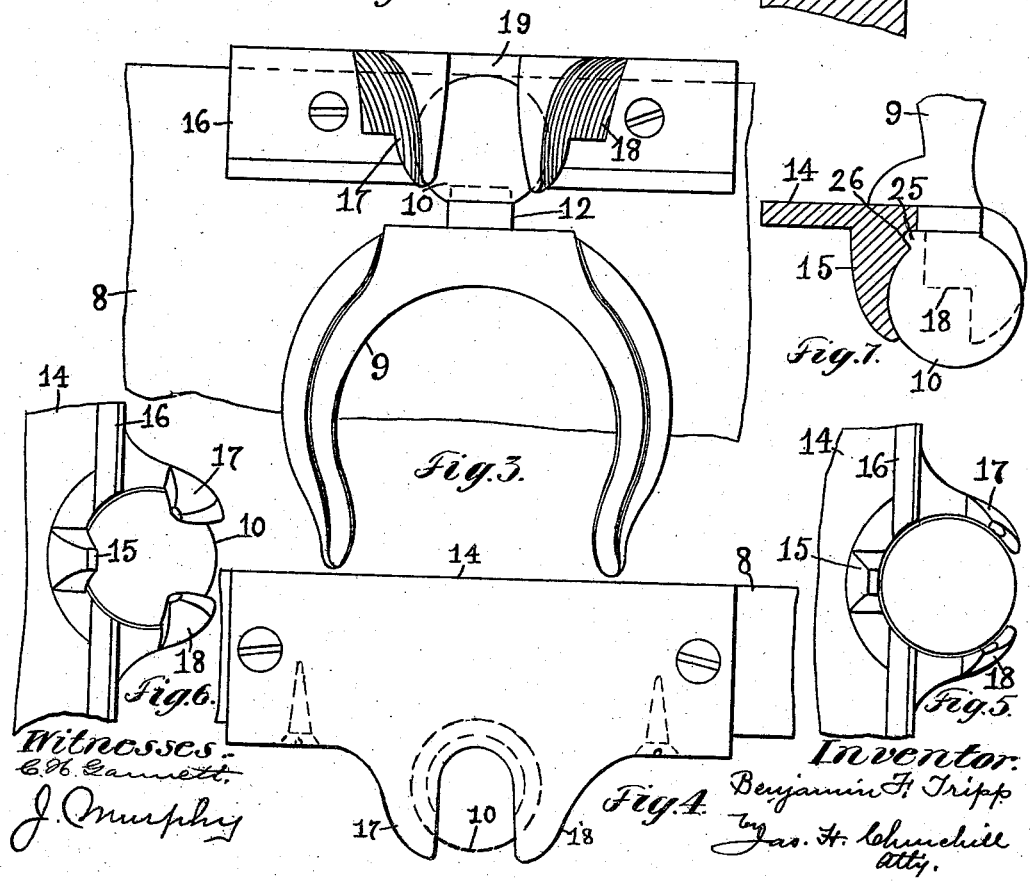

UNITED STATES PATENT OFFICE.

BENJAMIN F. TRIPP, OF MEDFORD, MASSACHUSETTS, ASSIGNOR OF ONE-HALF TO DANIEL G. LANGLANDS, OF MEDFORD, MASSACHUSETTS.

ROWLOCK.

No. 867,686.    Specification of Letters Patent.    Patented Oct. 8, 1907.

Application filed March 30, 1906. Serial No. 308,907.

*To all whom it may concern:*

Be it known that I, BENJAMIN F. TRIPP, a citizen of the United States, residing in Medford, in the county of Middlesex and State of Massachusetts, have invented an Improvement in Rowlocks, of which the following description, in connection with the accompanying drawings, is a specification, like letters on the drawings representing like parts.

This invention relates to a row-lock of that class commonly known as swivel row-locks, and has for its object to provide a row-lock of the class described, which is permanently affixed to the boat, and yet is capable of being removed from its operative or upright position when required or desired.

These and other features of this invention will be pointed out in the claims at the end of this specification.

Figure 1 represents in elevation a sufficient portion of a boat provided with a row-lock embodying this invention. Fig. 2, a section on the line 2—2, Fig. 1 looking toward the right. Fig. 3, a view similar to Fig. 1 with the row lock in its inoperative position. Fig. 4, a plan view of Fig. 3 with the row-lock omitted and showing the ball in dotted lines, and Figs. 5, 6 and 7, details to be referred to.

Referring to the drawing 8 represents a row-boat which may be of any desired or usual construction, and 9 represents a row-lock which, in accordance with this invention, is permanently secured to the boat 8 and is capable of being turned from its operative position shown in Fig. 1, into an inoperative position shown in Fig. 3. For this purpose, the row-lock 9 is provided with a rounded pivot member or ball 10 connected to the row-lock by a shank 12. The ball 10 is adapted to turn or swivel in a socket member, which may be formed as herein shown and consists of a top plate 14 having a depending finger or projection 15 and a side plate 16 preferably formed in one piece with the top plate 14 and provided with two projecting fingers 17, 18, separated from each other by a space 19 of a width equal to or greater than the shank 12 for a purpose as will be described. The fingers or projections 15, 17 and 18 are curved on their inner surface to conform to the shape of the ball, and the said fingers are normally separated at their ends or tips a sufficient distance to permit the ball to be inserted between them and into its socket as represented in Fig. 5, and are then bent to brace the ball as represented in Fig. 6 and thereby secure said ball in its socket.

The row-lock when first inserted into its socket and secured therein occupies the position shown in Fig. 3, and when thus secured it is capable of being turned into its operative or upright position shown in Figs. 1 and 2, the shank 12 passing through the opening 19 between the fingers 17, 18.

Provision is made for preventing the row-lock from being accidentally moved from its upright position into its lowered or depending position, and this may be accomplished as herein shown, by providing a locking projection 25 on the upper end of the ball, which is adapted to extend under the top plate and as herein shown into a recess 26 formed in the fingers 15, 17 and 18, when the row-lock is in its operative position shown in Figs. 1 and 2.

By reference to Fig. 7, it will be seen that the ball 10 is locked against rotary movement in a vertical plane by the projection 25, while at the same time it is free to turn or swivel in a substantially horizontal plane to respond to the movement of the oars in the act of rowing.

In approaching a landing, yacht or other boat, it may be desirable to remove the row-locks from their upright or operative position shown in Fig. 1, in order to avoid damage by the row-lock, while at the same time it is highly desirable to retain control of the row-locks. This is accomplished by the present invention, for it will be seen that the row-lock may be turned so as to disengage the locking projection 25 and bring it into line with the space or opening 19, whereupon the row-lock can be turned downward into the position shown in Fig. 3, in which position the row-lock is located on the inside of the boat and the top-plate 14 is left smooth.

It will be observed, that when the row-lock is in its inoperative position, it remains attached to the boat and is capable of being again placed into its operative position in a substantially short time, as it is only necessary to turn the row-lock upward in a vertical plane to carry the shank 12 between the fingers 17, 18, and then to turn the row-lock in a horizontal plane until the locking projection 25 is entered into its recess, whereupon the row-lock is again ready for use.

The row-lock may be provided with a bearing lug 30 to engage the top plate 14 and relieve the pivot from severe strain as represented in Fig. 2.

Claims.

1. The combination with a boat, of a socket member attached thereto and having an opening in its side communicating with said socket, and a row-lock provided with a ball movable in said socket and with a shank movable through said opening in said socket member to permit the row-lock to be turned from an upright into a depending position, and a locking projection on said ball to engage said socket member and prevent accidental displacement thereof, substantially as described.

2. The combination with a row-lock provided with a pivot member or ball, of a socket member comprising a top plate having a depending finger and side plates provided with fingers coöperating with the finger on said top plate to form a socket for the reception of said ball, the fingers of said side plates being separated to permit of movement of the row-lock between them, substantially as described.

3. The combination with a row-lock provided with a pivot member or ball, of a socket member provided with fingers forming a socket for the reception of said ball, said fingers being separated to permit of movement of the row-lock between them, and a projection on said ball to engage said socket member and prevent vertical movement of the row-lock in one direction, substantially as described.

In testimony whereof, I have signed my name to this specification in the presence of two subscribing witnesses.

BENJAMIN F. TRIPP.

Witnesses:
JAS. H. CHURCHILL,
J. MURPHY.